UNITED STATES PATENT OFFICE.

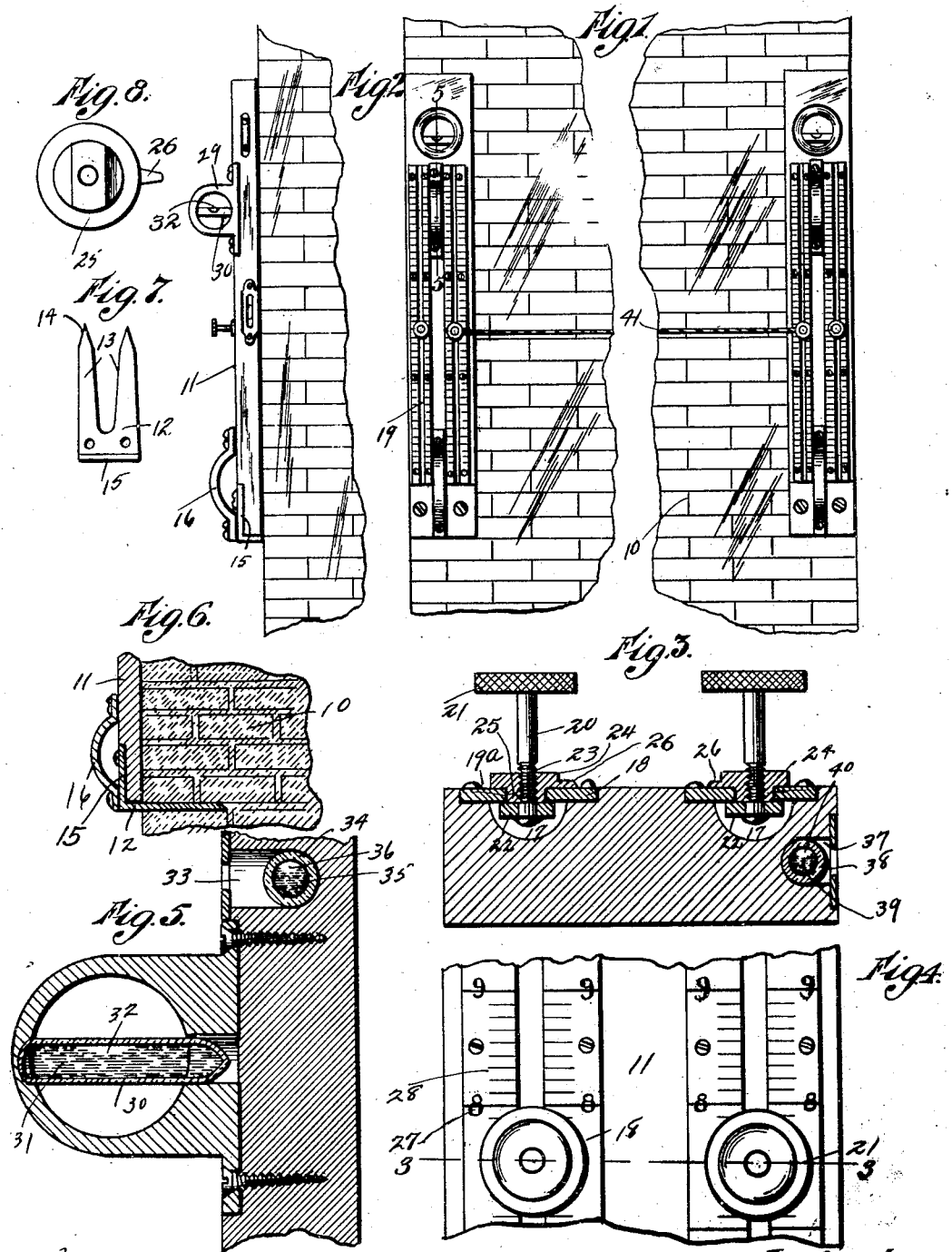

JOHN M. KEMP, OF DES MOINES, IOWA.

BUILDER'S LEVEL AND GUIDE.

1,251,785.     Specification of Letters Patent.     Patented Jan. 1, 1918.

Application filed December 15, 1913. Serial No. 807,350.

*To all whom it may concern:*

Be it known that I, JOHN M. KEMP, a citizen of the United States, and resident of Des Moines, in the county of Polk and State of Iowa, have invented a certain new and useful Builder's Level and Guide, of which the following is a specification.

The object of my invention is to provide a builder's level and guide of simple, durable and inexpensive construction.

More particularly, it is my object to provide a builder's level, adapted to be arranged in substantially vertical position and provided with means for finding a vertical and horizontal level at the corner or on the surface of a building or the like.

Still a further object is to provide such a level, provided with adjustable means for securing a level line to the device, and with characters for indicating the position of the part of the device to which the level line is designed to be secured.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a side elevation of a portion of a building, showing two of my improved builder's levels installed in position in front elevation, with a level line stretched between them.

Fig. 2 shows a similar view taken at right angles to the view shown in Fig. 1, showing the level, side elevation.

Fig. 3 shows a horizontal, sectional view, taken on the line 3—3 of Fig. 4 through the builder's level and illustrating the arrangement of the device for holding a level line.

Fig. 4 shows a detail view of a portion of the face of the level.

Fig. 5 shows a vertical, sectional view through the upper portion of the level taken on the line 5—5 of Fig. 1.

Fig. 6 shows a similar view, through the lower portion of the level and a part of the masonry wall.

Fig. 7 shows a detail plan view of the plate which is designed to be supported in the wall, and Fig. 8 shows a view of the inner end of a portion of the device to which the level line is secured, the collar being removed.

In the accompanying drawings I have used the reference numeral 10 to indicate generally a section of a building wall made of two superposed courses of masonry. My improved builder's level comprises an ordinary bar 11, which may be made of any suitable material and has substantially the general form of an ordinary carpenter's level. Secured to the lower end of the plumb body 11, when the latter is in vertical position, is a plate 12, having bifurcated arms 13, formed with sharp points 14 extending considerably beyond the level, as shown in Fig. 6. The plate 12 is preferably provided with an upwardly extending flange 15, designed to engage and to be secured to the front face of the level body 11. Secured to the front face of the level body 11, near the central portion of the lower end thereof, is a suitable handle 16. In the front face of the level are two parallel grooves 17, clearly shown in Fig. 3. Arranged on the face of the level in pairs over said grooves, are parallel metal bars 18, the bars of each pair being slightly spaced from each other to leave a slot 19 between them. The bars 18 are preferably inset in the face of the level, as shown in Fig. 3, and may be secured thereto by screws 19ª.

Slidably mounted between each pair of bars 18 is a pin 20 to which a level line may be fastened. On the outer end of each pin 20 is a corrugated head 21. The inner end of each pin 20 extends into one of the slots 17 and is rotatably but non-slidably mounted in a nut or collar 22. The portion of the shank of the pin 20 adjacent to the collar 22 is screw threaded at 23. Mounted upon the screw threaded portion 23 is a nut 24, having a downwardly extending portion 25, designed to slide between the pairs of bars 18. The portion 25 is longer than it is wide, as shown in Fig. 8, to prevent the rotation of the nut 24 between the bars 18. The upper portion of the nut 24 is preferably round and its diameter is greater than the width of the slot 19.

Formed on the upper portion of each nut 24 is a laterally extending finger or indicator 26. The faces of the bars 18 are provided with indicating characters 27 and dividing lines 28, as clearly shown in Figs. 1 and 4. Mounted on the face of the body 11, near the upper portion thereof, is a bracket 29 in which is a glass globe or bulb 30 projected forwardly from the body of the level as shown and designed to hold a spirit or liquid 31, in which is an air bubble 32. The bracket 29 and bulb 30 are so arranged that the bubble 32 may be sighted when looking at the device from the side and are used in adjusting the level to determine whether said level is tilted backward or forward from a perpendicular.

Formed in the upper portion of the body 11 is a slot 33, in which is a transversely extending transparent tube 34. In the tube 34 is contained a spirit or liquid 35, in which is an air bubble 36. The opening 33 extends to the front face of the level and the tube 34 is designed for use in adjusting the level in vertical position, and to ascertain when said level is or is not tilted laterally. Arranged in the side of the level body 11, preferably near the center thereof, and also off center toward the rear edge thereof to clear the opening 17, is another opening 37 in which is a similar glass globe or tube 38 containing a liquid 39, in which is an air bubble 40, designed for use when the level is laid on its side.

In the practical operation of my improved level, it is primarily designed for building masonry walls. Assuming that a course of masonry has been laid and is level, the plate 12 may be rested upon the top course of masonry with the rear face of the level in line with the surface of the wall below and a brick or block may be placed upon the plate 12 and the arms 13. The level may be adjusted in vertical position by aid of the air bubbles and the level may then be fixed firmly in any suitable way.

It will readily be seen that if desired, the sharp pointed arms 13 may be driven into the wall between any two courses of masonry. The level having been placed in position as above set forth, the wall may be built up adjacent to it and will be true. By securing two of the guides spaced apart from each other, on the same side of a wall 10, and at the same height, a level line 41 may be stretched between the two guides and secured to two of the pins 20, as clearly shown in Fig. 1. I preferably provide two of the pins 20 for each level so that more than two of the levels may be used in building a wall if desired and the level line 41 may be secured to each of the pins 20 of the middle level and to the similar pins of the other levels and stretched taut. As will be seen when my level is used, the mason may quickly and accurately fix the true lines for raising a wall.

The level may be used for a great variety of purposes in building and is adapted for raising a true corner or for securing a horizontal level line for laying courses of bricks, cement blocks or the like. On account of the use of the pins 20, in connection with the graduated plates 18, the level line may be quickly and easily moved the proper distance for laying each course at any desired level with relation to the other courses.

It will be understood that many changes may be made in the details of the construction of my level and it is my intention to cover by this application any such changes which may be included within the scope of the following claims.

I claim as my invention:

1. In a device of the class described, a frame member, a pair of laterally projecting teeth secured to the lower end thereof, a pair of spirit levels mounted on the upper portion of the frame in parallel horizontal planes and arranged with their axial lines lying in planes perpendicular to each other whereby said frame may be adjusted to a true vertical position, a pair of pins adjustably mounted on said frame whereby they may be secured in a plurality of positions relative to a vertical line through the frame and means for securing said pins in their adjusted positions.

2. In a device of the class described, a pair of spaced frames adapted to be detachably secured thereto, indicating devices mounted on each frame whereby they may be adjusted to a true vertical position, a pin slidably mounted on each frame whereby said pins may be adjusted vertically, means for securing said pins in their adjusted positions and a flexible device having each end secured to one of said pins.

Des Moines, Iowa, November 20, 1913.

JOHN M. KEMP.

Witnesses:
M. WALLACE,
S. ROBINSON.

Copies of this patent may be obtained for five cents each, by addressing the "Commissioner of Patents, Washington, D. C."